United States Patent
Ito

(10) Patent No.: US 11,593,457 B2
(45) Date of Patent: Feb. 28, 2023

(54) RECORDING MEDIUM RECORDING ANALYSIS PROGRAM, INFORMATION PROCESSING APPARATUS, AND ANALYSIS METHOD

(71) Applicant: FUJITSU LIMITED, Kawasaki (JP)

(72) Inventor: Toshio Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 502 days.

(21) Appl. No.: 16/749,521

(22) Filed: Jan. 22, 2020

(65) Prior Publication Data

US 2020/0242194 A1     Jul. 30, 2020

(30) Foreign Application Priority Data

Jan. 25, 2019   (JP) .............................. JP2019-011400

(51) Int. Cl.
| | | |
|---|---|---|
| *G06F 17/10* | (2006.01) | |
| *G06F 17/18* | (2006.01) | |
| *G06K 9/62* | (2022.01) | |
| *G06V 20/58* | (2022.01) | |

(52) U.S. Cl.
CPC ........... *G06F 17/18* (2013.01); *G06K 9/6221* (2013.01); *G06V 20/584* (2022.01)

(58) Field of Classification Search
CPC ...... G06F 17/18; G06K 9/6221; G06K 9/623; G06V 20/584; G06V 10/62; G06V 10/766; G06V 20/58; A61B 18/1445; G01R 31/3828; G05B 13/048; G06N 5/04; G06Q 10/0633; G08G 1/20; H04L 9/40

See application file for complete search history.

(56) References Cited

U.S. PATENT DOCUMENTS

| | | | |
|---|---|---|---|
| 10,176,435 B1 * | 1/2019 | Sarkar | ..................... G06N 20/00 |
| 11,468,263 B1 * | 10/2022 | Wu | ....................... G06K 9/6265 |
| 2007/0288105 A1 | 12/2007 | Sekine et al. | |

(Continued)

FOREIGN PATENT DOCUMENTS

| | | | | |
|---|---|---|---|---|
| CN | 105021617 A | * | 11/2015 | |
| CN | 106934514 A | * | 7/2017 | ......... G06Q 10/0633 |

(Continued)

OTHER PUBLICATIONS

Natarajan, Ramesh, U.S. Patent Application Publication 2011/0046924 A1, Feb. 2011, see the shortened version.*

(Continued)

*Primary Examiner* — Kandasamy Thangavelu
(74) *Attorney, Agent, or Firm* — Fujitsu Patent Center

(57) ABSTRACT

A non-transitory computer-readable recording medium having stored therein an analysis program causing a computer to execute processing includes: generating a regression function including a plurality of explanatory variables and an objective variable based on regression analysis using observed values of a plurality of physical elements each related to motion of a moving object; dividing an explanatory variable space containing the plurality of explanatory variables into a plurality of regions by using the regression function; and generating contribution information on a contribution of each of the plurality of explanatory variables to the objective variable for each of the plurality of regions.

5 Claims, 17 Drawing Sheets

(56) References Cited

U.S. PATENT DOCUMENTS

| | | | |
|---|---|---|---|
| 2011/0046924 A1* | 2/2011 | Natarajan | G06F 17/18 703/2 |
| 2014/0236871 A1 | 8/2014 | Fujimaki et al. | |
| 2015/0178633 A1* | 6/2015 | ElBsat | G05B 13/048 706/14 |
| 2015/0362559 A1* | 12/2015 | Hametner | G01R 31/3828 702/63 |
| 2017/0315960 A1 | 11/2017 | Ochiai | |
| 2021/0365008 A1* | 11/2021 | Park | G05B 19/4155 |

FOREIGN PATENT DOCUMENTS

| | | | | |
|---|---|---|---|---|
| FR | 2905024 A1 * | 2/2008 | | G08G 1/20 |
| JP | 3622744 B2 * | 2/2005 | | H04L 9/40 |
| JP | 2007-329415 | 12/2007 | | |
| JP | 2012-027683 | 2/2012 | | |
| JP | 2014-160456 | 9/2014 | | |
| JP | 2015-097019 | 5/2015 | | |
| JP | 2016-031629 | 3/2016 | | |
| JP | 2016164730 A * | 9/2016 | | G06N 5/04 |
| JP | 2017-134478 | 8/2017 | | |
| JP | 2018519914 A * | 7/2018 | | A61B 18/1445 |
| WO | 2009/128442 A1 | 10/2009 | | |
| WO | 2016/079972 A1 | 5/2016 | | |

OTHER PUBLICATIONS

ElBsat et al., U.S. Patent Application Publication 2015/0178633 A1, Jun. 2015, see the shortened version.*

Hametner et al., U.S. Patent Application Publication 2015/0362559 A1, Dec. 2015, see the shortened version.*

"FOMM and Fujitsu in Alliance to Create a New Mobile Society", [online], Fujitsu press release, Mar. 22, 2018, [searched on Jan. 7, 2019], Internet <URL: http://pr.fujitsu.com/jp/news/2018/03/22.html>.

"Variable Selection Using AIC", [online], PukiWiki, [searched on Jan. 7, 2019], Internet <URL: http://hnami.or.tv/d/index.php?AIC%A4%F2%BB%C8%A4%C3%A4%BF%CA%D1%BF%F4%C1%AA%C2%F2> **A concise explanation of the relevance is found on p. 1 of the Specification and is also provided through Patent Literature titled "Stepwise Regression,".

"Method of Calculating Akaike's Information Criterion (AIC)", [online], statistical WEB, [searched on Jan. 7, 2019], Internet <URL: https://bellcurve.jp/statistics/blog/15754.html> **A concise explanation of the relevance is found on p. 1 of the Specification and is also provided through Patent Literature titled "Akaike information criterion."

Naoki Hamada et al., "e-Bagging: The Information Geometric Dual of Breiman's Bagging an Application to the Nadaraya-Watson Regression with the k-Nearest Neighbor Crossover Kernel", IEICE Technical Report, vol. 115, No. 112, IBISML2015-23, pp. 187-194, Jun. 2015.

Naoki Hamada et al., "Population Synthesis via k-Nearest Neighbor Crossover Kernel", 2015 IEEE International Conference on Data Mining, pp. 763-768, 2015.

"Stepwise regression", Wikipedia, [searched on Oct. 31, 2019], Internet <URL: https://en.wikipedia.org/wiki/Stepwise_regression>.

"Akaike information criterion", Wikipedia, [searched on Oct. 31, 2019], Internet <URL: https://en.wikipedia.org/wiki/Akaike_information_criterion>.

JPOA—Office Action of Japanese Patent Application No. 2019-011400 dated Oct. 4, 2022 with English translation.

* cited by examiner

RECORDING MEDIUM RECORDING ANALYSIS PROGRAM, INFORMATION PROCESSING APPARATUS, AND ANALYSIS METHOD

CROSS-REFERENCE TO RELATED APPLICATION

This application is based upon and claims the benefit of priority of the prior Japanese Patent Application No. 2019-11400, filed on Jan. 25, 2019, the entire contents of which are incorporated herein by reference.

FIELD

The embodiments discussed herein are related to a recording medium, an analysis apparatus, and an analysis method.

BACKGROUND

As for a moving object like an electric vehicle (EV) that moves in a space, the motion thereof receives a combination of various physical influences.

Related is disclosed in "FOMM and Fujitsu in Alliance to Create a New Mobile Society", [online], Fujitsu press release, Mar. 22, 2018, [searched on Jan. 7, 2019], Internet <URL: http://pr.fujitsu.com/jp/news/2018/03/22.html>, "Variable Selection Using AIC", [online], PukiWiki, [searched on Jan. 7, 2019], Internet <URL: http://hnami.or.tv/d/index.php?AIC%A4%F2%BB%C8%A4%C3%A4%BF%CA%D1BF%F4%C1%AA%C2%F2>, "Method of Calculating Akaike's Information Criterion (AIC)", [online], statistical WEB, [searched on Jan. 7, 2019], Internet <URL: https://bellcurve.jp/statistics/blog/15754.html>, and Hamada et al., "e-Bagging: The Information Geometric Dual of Breiman's Bagging—An Application to the Nadaraya-Watson Regression with the k-Nearest Neighbor Crossover Kernel", IEICE Tech. Rep., vol. 115, no. 112, IBISML 2015-23, pp. 187-194, June, 2015.

SUMMARY

According to an aspect of the embodiments, a non-transitory computer-readable recording medium having stored therein an analysis program causing a computer to execute processing includes: generating a regression function including a plurality of explanatory variables and an objective variable based on regression analysis using observed values of a plurality of physical variables each related to motion of a moving object; dividing an explanatory variable space containing the plurality of explanatory variables into a plurality of regions by using the regression function; and generating contribution information on a contribution of each of the plurality of explanatory variables to the objective variable for each of the plurality of regions.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
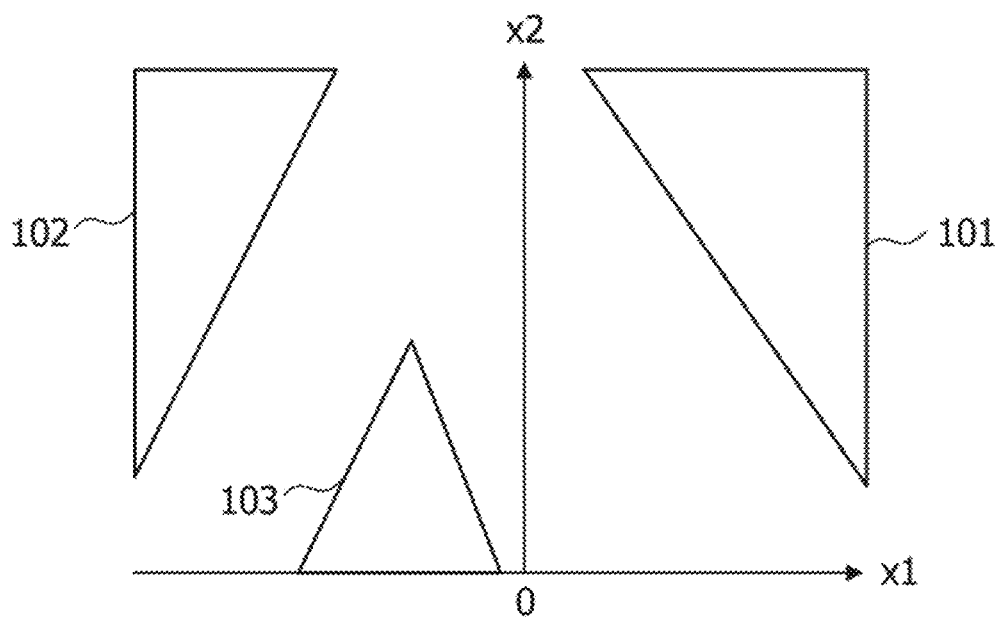
FIG. 1 is a diagram illustrating a first combination of explanatory variables.

By using multiple physical variables that affect the motion of a moving object as explanatory variables and an objective variable, a regression model that estimates a physical variable represented by the objective variable may be constructed.

A mean absolute percentage error (MAPE) is provided as an index for evaluating a degree of influence indicating how much explanatory variables combinedly affect an objective variable. The MAPE calculation method for the regression model includes the following procedure.

(P1) An analyst prepares learning data (XLt, yLt) (t=1, 2, ..., q) and verification data (XVj, yVj) (j=1, 2, ..., n) for explanatory variables X=(x1, x2, ..., xm) and an objective variable y. Here, m, q, and n are integers of 2 or more, and (XLt, yLt) and (XVj, yVj) are observed values of (X, y).

(P2) The analyst performs supervised learning using the learning data (XLt, yLt) to generate a regression model y=f(X).

(P3) The analyst calculates the MAPE in accordance with the following equation using the verification data yVj and the estimated value yj=f(XVj) obtained based on the regression model.

$$MAPE = \frac{1}{n}\sum_{j=1}^{n} \frac{|yj - yVj|}{|yVj|} \quad (1)$$

The MAPE of a specific explanatory variable xi (i=1, 2, ..., m) with respect to the objective variable y is calculated by using, as XV1 to XVn in the procedure (P1), n values of XVj in which the value of the specific explanatory variable xi is changed and the values of the other explanatory variables xi are fixed, thereby making it possible to figure out the degree of influence of the specific explanatory variable xi. In this case, the smaller the MAPE of an explanatory variable xi, the higher the degree of influence on the objective variable y.

As a method of evaluating multiple explanatory variables that combinedly affect an objective variable and selecting optimal explanatory variables, a stepwise method (backward stepwise method) is provided. The procedure of the stepwise method is as follows.

(P11) An analyst prepares learning data (XLt, yLt) (t=1, 2, . . . , q) and verification data (XVj, yVj) (j=1, 2, . . . , n) for explanatory variables X=(x1, x2, . . . , xm) and an objective variable y.

(P12) The analyst performs supervised learning using the learning data (XLt, yLt) to generate a regression model y=f(X).

(P13) The analyst removes the explanatory variables one by one in such a way that the value of Akaike's Information Criterion (AIC) decreases, and stops the removal of the explanatory variables when the value of the AIC increases even if any explanatory variable is removed.

In addition to a linear model such as a multiple regression, a regression using a k-nearest neighbor crossover kernel is provided as a nonlinear model.

In the MAPE-based evaluation method or stepwise method of the related art, it is difficult to identify the influences of physical variables on an objective variable related to the motion of a moving object, according to the conditions of the moving object.

This problem occurs not only in the analysis of the motion of an EV, but also in the analysis of the motion of another moving object.

In one aspect, the influences of physical variables on an objective variable related to the motion of a moving object may be identified, according to conditions of the moving object.

Hereinafter, the embodiments will be described in detail with reference to the drawings.

Depending on conditions of a moving object, a different physical variable has a large influence on the motion of the moving object. For this reason, it is desirable to select physical variables to be used as the explanatory variables according to the conditions of the moving object. As an example, description will be given of a case where the moving object is an EV and the objective variable is the state of charge (SOC) of the battery. The SOC may also be referred to as a charge state or a charging rate in some cases.

Unlike a gasoline vehicle, the EV has a function of recovering the SOC. When the SOC is recovered, a travelable distance is extended. In view of this, description will be given of explanatory variables which affect the SOC and a value range of each explanatory variable which decreases or increases the SOC.

FIG. 1 illustrates a first combination of explanatory variables describing the motion of the EV. The horizontal axis in FIG. 1 is for an explanatory variable x1 representing the gradient of a road surface, and the vertical axis is for an explanatory variable x2 representing the speed of the EV. When x1 is positive, the road surface is uphill, whereas when x1 is negative, the road surface is downhill. Here, x2 may represent a travel distance per unit time. In the case where m>2, other explanatory variables not illustrated are also used. Therefore, an explanatory variable space expressed by X=(x1, x2, . . . , xm) is an m-dimensional space.

Regions 101 to 103 in a plane expressed by x1 and x2 represent regions in which the SOC is affected. The region 101 represents a region where the SOC is reduced due to large power consumption of the battery. The region 102 represents a region where the SOC is increased due to a large amount of charge of the battery. The region 103 represents a region where the SOC is hardly changed because both the power consumption and the amount of charge are small.

Among these, the region 103 is a region where x1 and x2 are unnecessary as explanatory variables describing the SOC because x1 and x2 do not affect the SOC. The region other than the regions 101 to 103 is a gray area and no distinct border is present.

Figure 2:
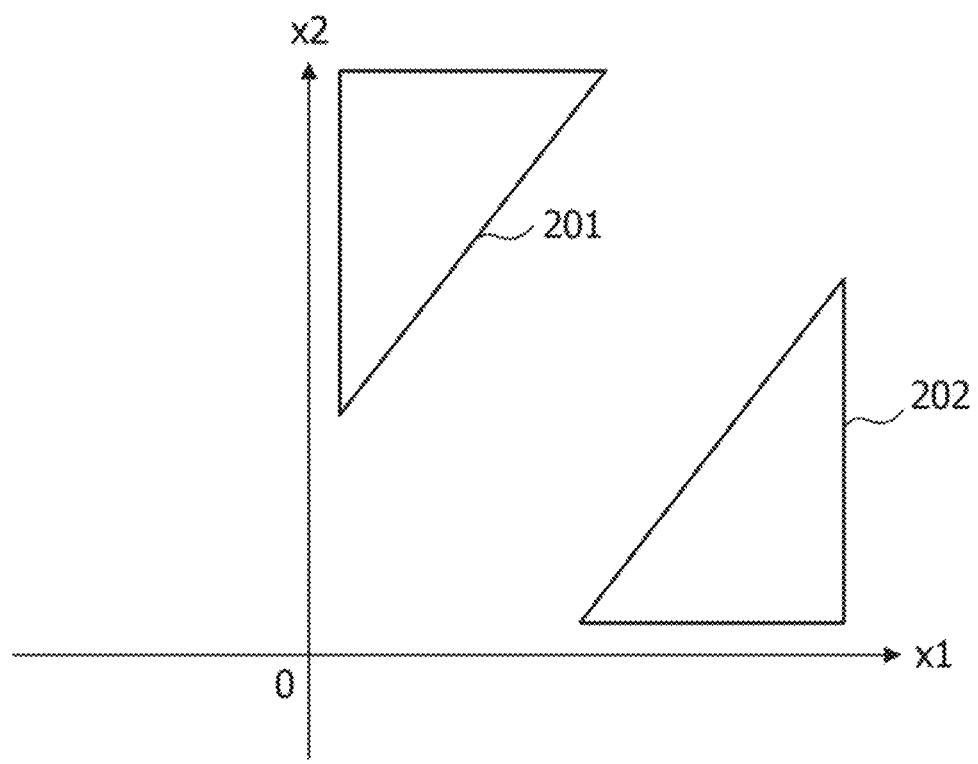
FIG. 2 is a diagram illustrating a second combination of explanatory variables.

FIG. 2 illustrates a second combination of explanatory variables describing the motion of the EV. In FIG. 2, the horizontal axis is for an explanatory variable x1 representing the gradient of a road surface, and the vertical axis is for an explanatory variable x2 representing the wind speed of wind blowing from the rear to the front of the EV.

In a plane expressed by x1 and x2, a region 201 is a region where the influence of the wind speed on the SOC is larger than the influence of the gradient on the SOC, and a region 202 is a region where the influence of the gradient on the SOC is larger than the influence of the wind speed on the SOC. In this way, the magnitude relation between the influences of the explanatory variables on the SOC varies between the regions within the explanatory variable space. The region other than the regions 201 and 202 is a gray area and no distinct border is present.

Methods of identifying the influences of physical variables on the objective variable related to the motion of a moving object according to conditions of a moving object include processing of enumerating explanatory variables for each region in the explanatory variable space, and processing of removing unnecessary explanatory variables for each region in the explanatory variable space.

In the processing of enumerating the explanatory variables, it is desirable to divide the explanatory variable space into regions between which the order of the explanatory variables in terms of the degree of influence differs, and to list the explanatory variables in descending order of the degree of influence for each region. The MAPE-based evaluation method or stepwise method of the related art, however, has no way to know which of explanatory variables x1 to xm has a greater degree of influence in which region, and also no way to know the order of the explanatory variables in terms of the degree of influence in each region. Therefore, it is difficult to divide the explanatory variable space into regions, and to enumerate the explanatory variables in descending order of the degree of influence for each region.

In the processing of removing unnecessary explanatory variables, it is desirable to divide the explanatory variable space into regions between which explanatory variables unnecessary for the estimation of the objective variable differ, and to select and remove the unnecessary explanatory variables for each region. The MAPE-based evaluation method of the related art, however, has no way to know which explanatory variables are unnecessary, and therefore has difficulty in dividing the explanatory variable space into regions and removing the unnecessary explanatory variables for each region.

Meanwhile, the stepwise method is even able to find which explanatory variables are unnecessary in the entire explanatory variable space, but still has difficulty in dividing the explanatory variable space into regions, and removing the unnecessary explanatory variables for each region.

Figure 3:
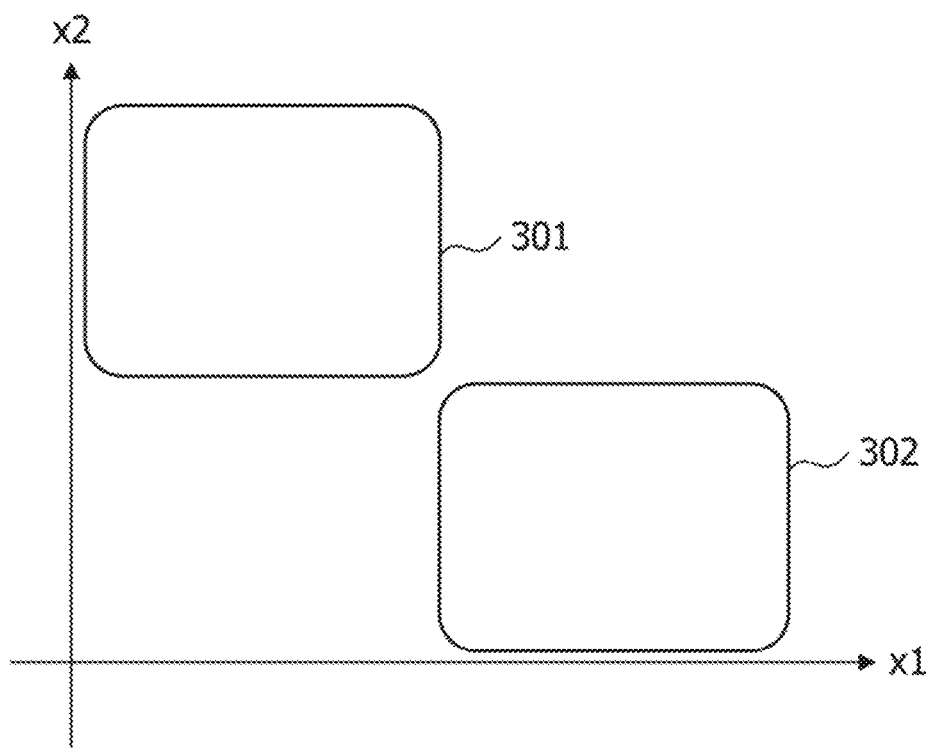
FIG. 3 is a diagram illustrating regions between which an unnecessary explanatory variable differs.

FIG. 3 illustrates an example of regions between which an unnecessary explanatory variable differs. In FIG. 3, the horizontal axis is for an explanatory variable x1, and the vertical axis is for an explanatory variable x2. In a region

301, x2 is an unnecessary explanatory variable because x2 does not affect the objective variable. On the other hand, in a region 302, x1 is an unnecessary explanatory variable because x1 does not affect the objective variable. However, in the stepwise method, it is difficult to find the regions 301 and 302, and as a result, the explanatory variables are not omitted in both of the regions.

Figure 4:
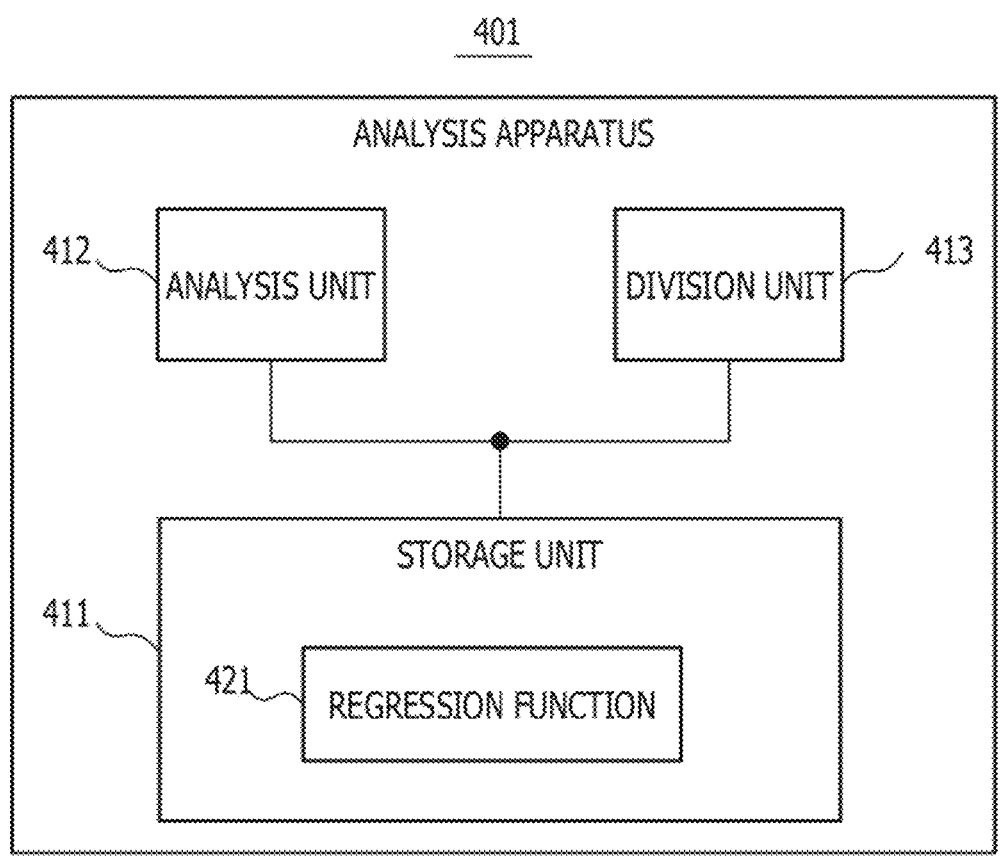
FIG. 4 is a functional configuration diagram of an analysis apparatus.

FIG. 4 illustrates a functional configuration example of an analysis apparatus in an embodiment. An analysis apparatus 401 illustrated in FIG. 4 includes a storage unit 411, an analysis unit 412, and a division unit 413.

Figure 5:
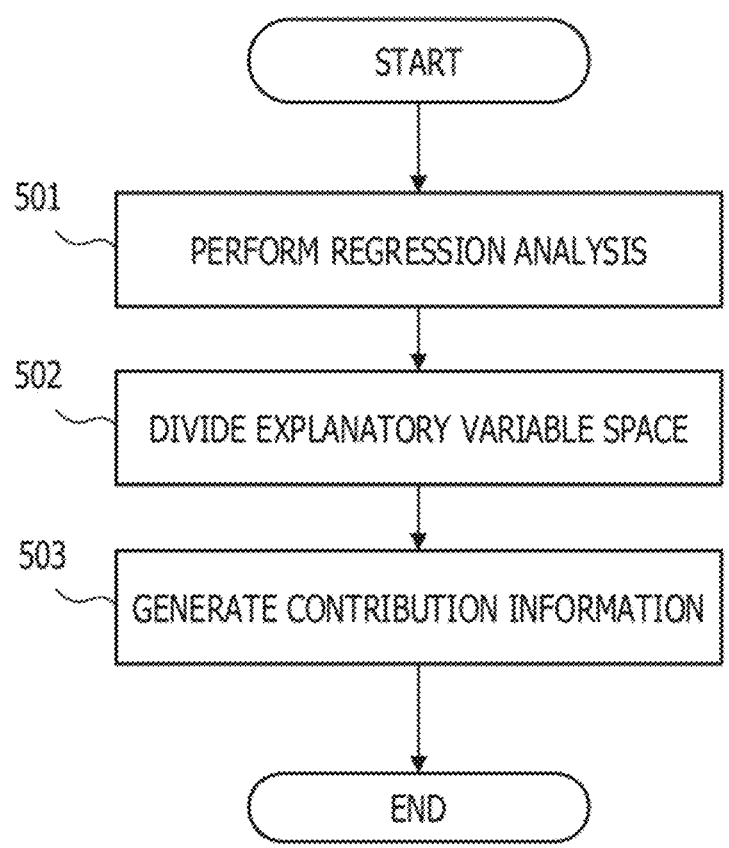
FIG. 5 is a flowchart of analysis processing.

FIG. 5 is a flowchart illustrating an example of analysis processing performed by the analysis apparatus 401 in FIG. 4. First, the analysis unit 412 generates a regression function 421 including multiple explanatory variables and an objective variable based on regression analysis using the observed values of the multiple physical variables related to the motion of the moving object, and stores the regression function 421 in the storage unit 411 (step 501). The storage unit 411 stores the regression function 421.

Next, the division unit 413 divides the explanatory variable space containing the multiple explanatory variables into multiple regions by using the regression function 421 (step 502), and generates contribution information on a contribution of each of the multiple explanatory variables to the objective variable for each of the multiple regions (step 503).

The analysis apparatus 401 in FIG. 4 is able to identify the influences of physical variables on an objective variable related to the motion of a moving object according to conditions of the moving object.

Figure 6:
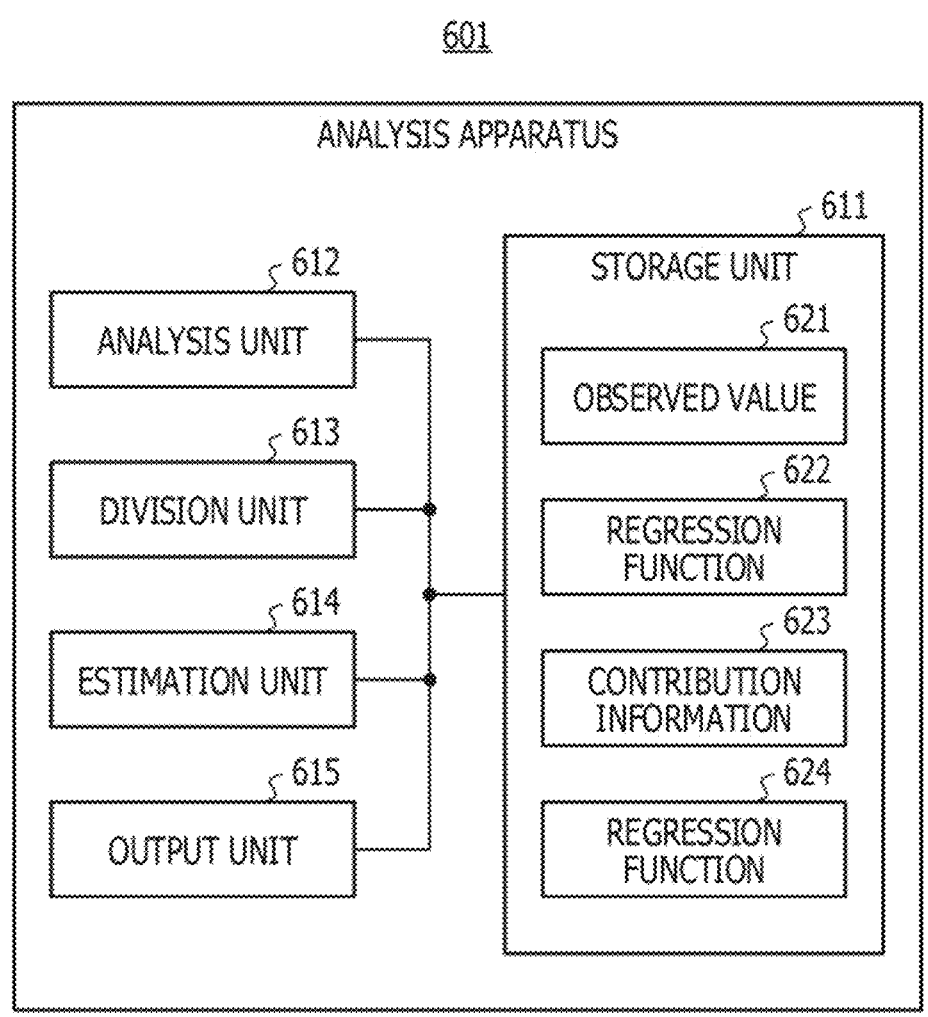
FIG. 6 is a functional configuration diagram illustrating a first specific example of the analysis apparatus.

FIG. 6 illustrates a first specific example of the analysis apparatus 401 in FIG. 4. An analysis apparatus 601 illustrated in FIG. 6 includes a storage unit 611, an analysis unit 612, a division unit 613, an estimation unit 614, and an output unit 615. The storage unit 611, the analysis unit 612, and the division unit 613 correspond to the storage unit 411, the analysis unit 412, and the division unit 413 in FIG. 4, respectively. For example, the analysis apparatus 601 may be an information processing apparatus such as a server provided on a cloud.

The storage unit 611 stores observed values 621 of multiple physical variables related to the motion of a moving object. The moving object may be an EV, an automobile, an aircraft, a robot, or the like. The EVs include an electric vehicle, a power-assisted bicycle, an electric scooter, and the like.

For example, when the moving object is an EV, physical variables to be used include the speed of the EV, the travel distance of the EV, the voltage of a battery, the output current of the battery, the SOC of the battery, the wind speed, the wind direction, the gradient of a road surface, and so on. The analysis unit 612 performs regression analysis by supervised learning using the observed values 621 as learning data to generate a regression function 622 of a regression model, and stores the regression function 622 in the storage unit 611. Any one of the physical variables is used as the objective variable y of the regression function 622, and the other physical variables are used as the explanatory variables $X=(x1, x2, \ldots, xm)$. The regression function 622 corresponds to the regression function 421 in FIG. 4.

For example, if the moving object is an EV, the objective variable may be the SOC. In this case, the explanatory variables may be the speed of the EV and the gradient of a road surface, or may be the gradient of the road surface and the wind speed.

The division unit 613 divides the explanatory variable space containing the multiple explanatory variables of the regression function 622 into multiple regions, generates contribution information 623 on the contribution of each explanatory variable to the objective variable for each region, and stores the contribution information 623 in the storage unit 611. Each region corresponds to a portion of the explanatory variable space.

Based on the contribution information 623, the estimation unit 614 selects explanatory variables each making a great contribution to the objective variable for each region, generates a regression function 624 for each region using only the selected explanatory variables, and stores the regression function 624 in the storage unit 611. Then, the estimation unit 614 estimates the value of the objective variable in each region by using the regression function 624, thereby generating the estimated value. The output unit 615 outputs the estimated value generated by the estimation unit 614.

The regression function 622 used herein is a function which is once differentiable and whose derivative after differentiation is continuous. For example, the analysis unit 612 is able to generate such a regression function 622 by performing the k-nearest neighbor crossover kernel regression described in Hamada et al.

The k-nearest neighbor crossover kernel regression is regression analysis using a kernel formed of multivariate Gaussian densities for multiple (k) nearest neighbors. Even when there is a dense or sparse portion in the observed values 621, the k-nearest neighbor crossover kernel regression is able to create an appropriate higher-order kernel regression function (f: $X \in R^m \to y \in R$), and thereby enables fitting of the sample points. The kernel regression function created is infinitely differentiable.

The division unit 613 calculates gradients of the regression function 622, and divides the explanatory variable space into multiple regions based on the calculated gradients. A gradient vector df of the regression function f(X) is calculated by the following equation.

$$df = (dx1, dx2, \ldots, dxm) = \left(\frac{\partial f(X)}{\partial x1}, \frac{\partial f(X)}{\partial x2}, \ldots, \frac{\partial f(X)}{\partial xm}\right) \quad (2)$$

In the right side of Formula (2), dxi (i=1, 2, . . . , m) represents an xi component of df.

Figure 7:
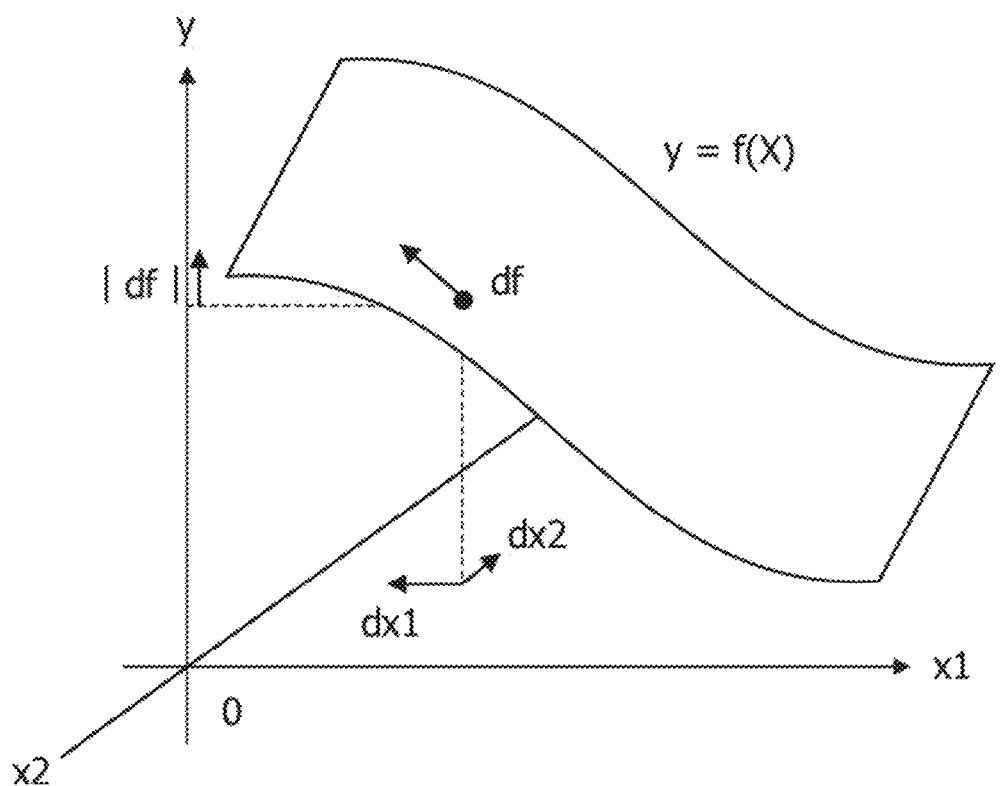
FIG. 7 is a diagram illustrating a gradient vector.

FIG. 7 illustrates an example of a gradient vector df in the case where m=2. In this case, the explanatory variable space is a plane expressed by x1 and x2. Here, dx1 and dx2 represent an x1 component and an x2 component of df, respectively, and |df| represents an amount of change in an objective variable y.

Figure 8:
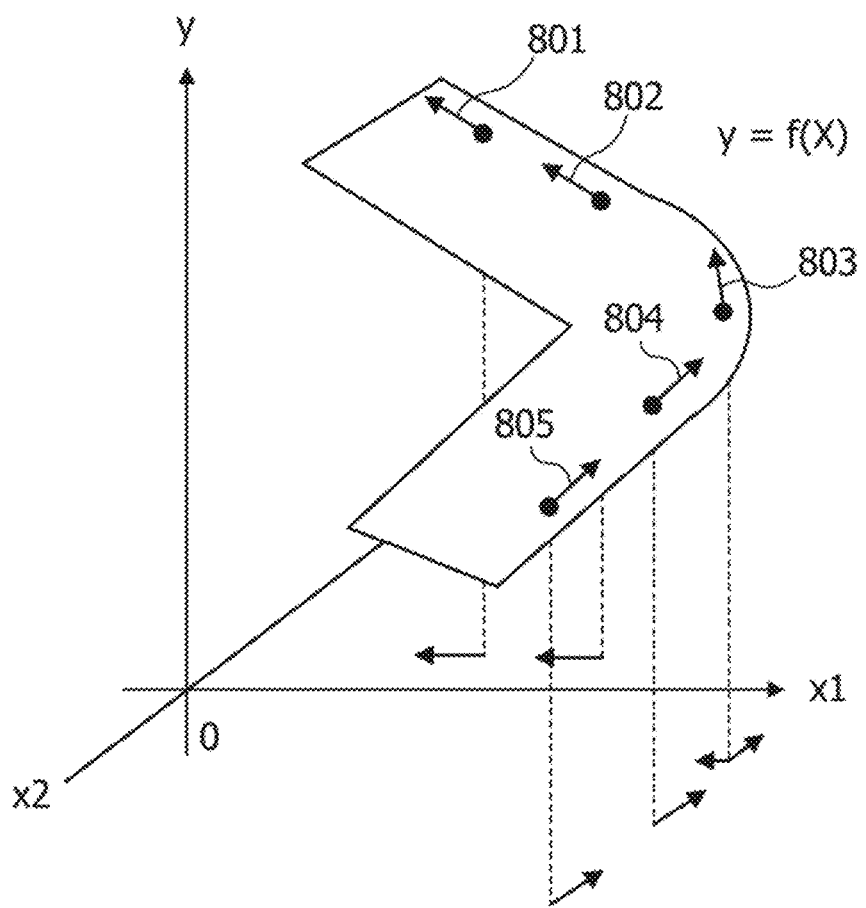
FIG. 8 is a diagram illustrating multiple gradient vectors.

FIG. 8 illustrates an example of multiple gradient vectors df for the regression function f(X) in FIG. 7. Each of gradient vectors 801 to 805 indicates a direction in which the value of the objective variable y changes most at the corresponding point in the explanatory variable space. The xi component of each gradient vector represents the degree of influence of the physical variable represented by xi on the objective variable y.

For example, since the x2 components of the gradient vectors 801 and 802 are 0, it is seen that only x1 affects the objective variable y and x2 does not affect the objective variable y in the regions corresponding to these gradient vectors in the explanatory variable space. Since the x1 components of the gradient vectors 804 and 805 are 0, only x2 affects the objective variable y and x1 does not affect the objective variable y in the regions corresponding to these gradient vectors.

On the other hand, since the x1 and x2 components of the gradient vector 803 are not 0, both of the x1 and x2 components affect the objective variable y in the region corresponding to the gradient vector 803.

By calculating the gradient vector df in the direction in which the value of the objective variable y changes most as described above, it is possible to determine the degrees of local influences of xi on the objective variable y, and to divide the explanatory variable space into multiple regions among which the degrees of influences of the respective explanatory variables differ.

Figure 9:
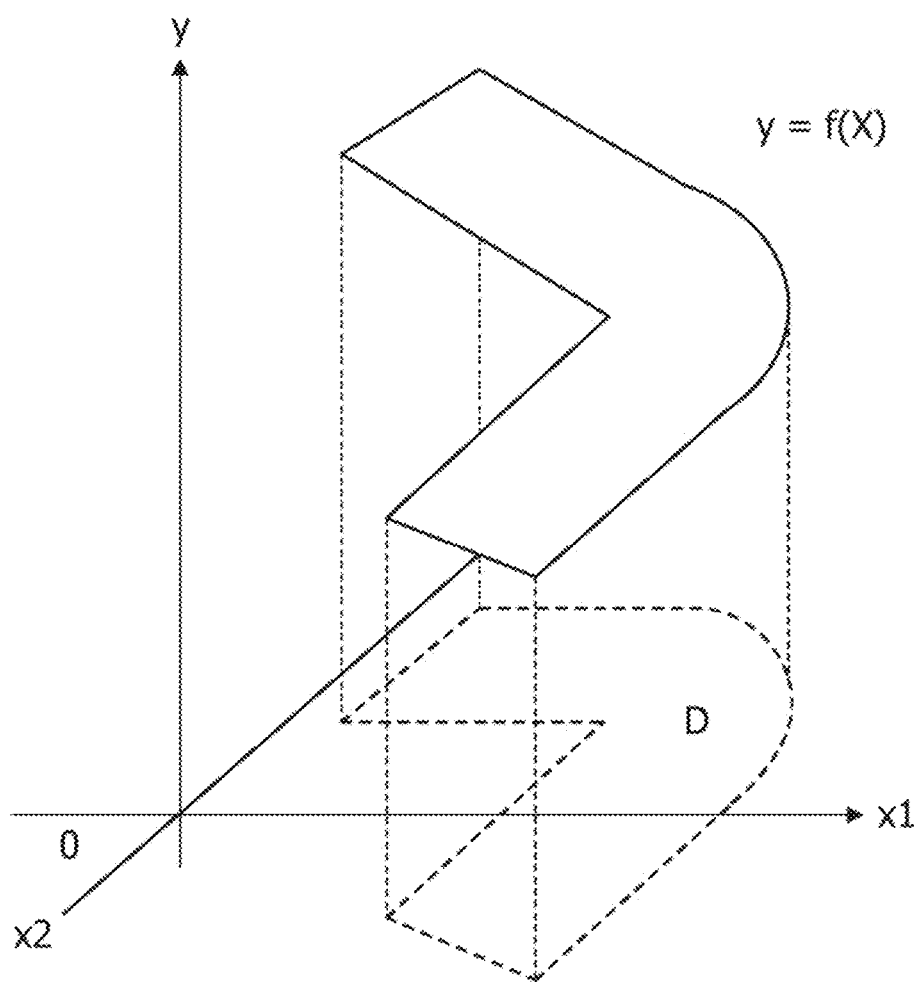
FIG. 9 is a diagram illustrating a domain of a regression function.

FIG. 9 illustrates an example of a domain of the regression function f(X) in FIG. 7. Although the entire explanatory variable space may be used as the domain of the regression function f(X), the regression function f(X) generated in a region where no observed value 621 exists or in a region where only few observed values 621 exist has low reliability. Therefore, a domain D where a sufficient number of observed values 621 are obtained may be used as the domain and only the domain D may be divided.

For example, the division unit 613 may calculate the gradient vector df of the regression function 622 at each of the multiple points in the explanatory variable space, and divide the explanatory variable space into multiple regions based on a result of comparing the xi component of df with a threshold. In this case, the contribution information 623 indicates whether or not the xi component of df is larger than the threshold for each region.

In addition, the division unit 613 may also divide the explanatory variable space into multiple regions based on a result of comparing multiple xi components of df with each other. In this case, the contribution information 623 indicates the magnitude relation among the multiple xi components for each region.

Figure 10:
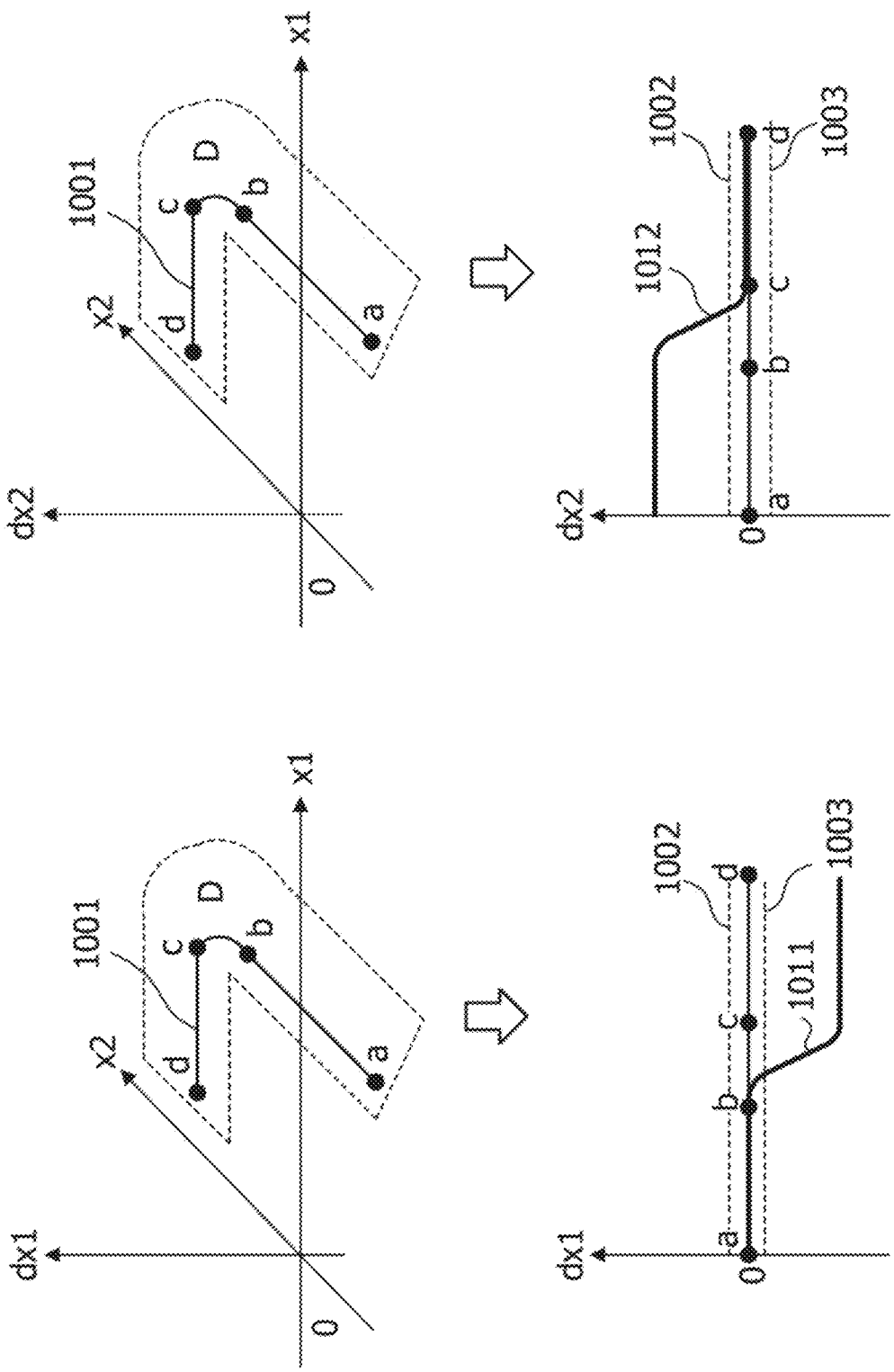
FIGS. 10A and 10B are diagrams illustrating a threshold for gradient vectors.

FIGS. 10A and 10B illustrate examples of the threshold for the gradient vector df in FIG. 7. FIG. 10A illustrates an example of dx1 in the domain D in FIG. 9. A curve 1011 indicates a change in dx1 on a curve 1001 in the domain D, and dashed lines 1002 and 1003 indicate the threshold. In the section from the point a to the point b out of the points a to d on the curve 1001, the magnitude of dx1 is smaller than the threshold. Therefore, in this section, the degree of influence of x1 on the objective variable y is small, so that x1 may be omitted from the regression function f(X).

FIG. 10B illustrates an example of dx2 in the domain D in FIG. 9. A curve 1012 indicates a change in dx2 on the curve 1001. In the section from the point c to the point d, the magnitude of dx2 is smaller than the threshold. Therefore, in this section, the degree of influence of x2 on the objective variable y is small, so that x2 may be omitted from the regression function f(X).

Figure 11:
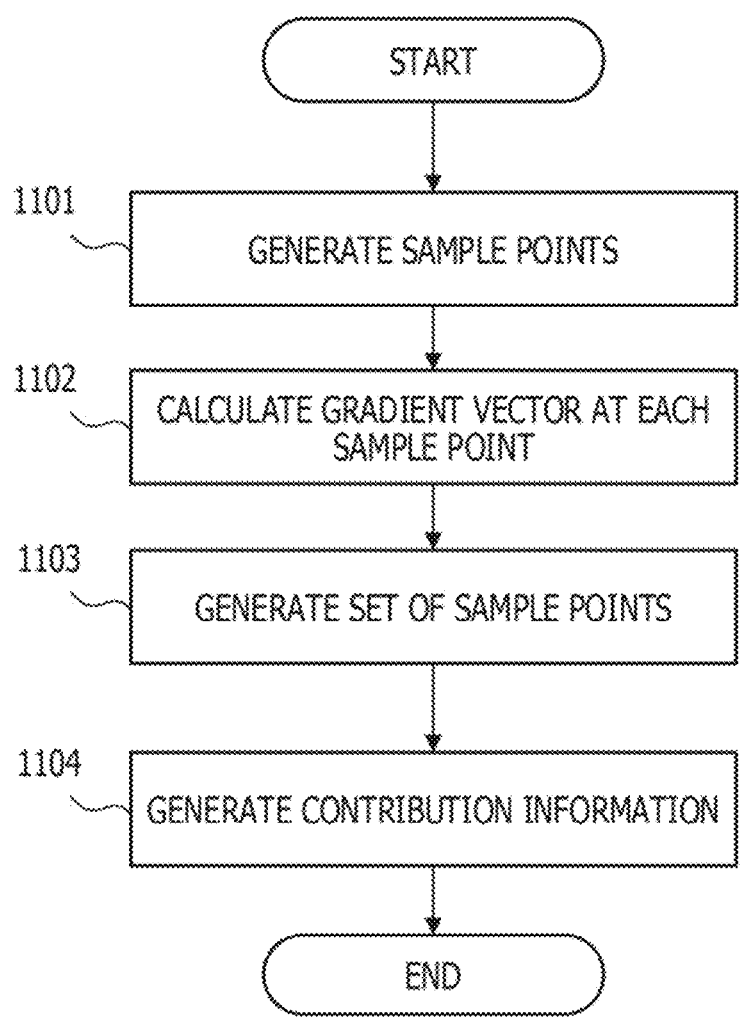
FIG. 11 is a flowchart of division processing.

FIG. 11 is a flowchart illustrating an example of division processing performed by the division unit 613. In this example, the domain D is expressed by the following equation using the sections of xi [ri, si] (i=1, . . . , m).

$$D=[r1,s1]\times \ldots \times[rm,sm] \quad (3)$$

First, the division unit 613 generates multiple sample points p (u1, . . . , um) (ui=0, 1, . . . , ki) within the domain D by using a natural number ki in accordance with the following equation (step 1101).

$$p(u1, \ldots, um) = \left(r1 + \frac{u1(s1-r1)}{k1}, \ldots, rm + \frac{um(sm-rm)}{km}\right) \quad (4)$$

Figure 12:
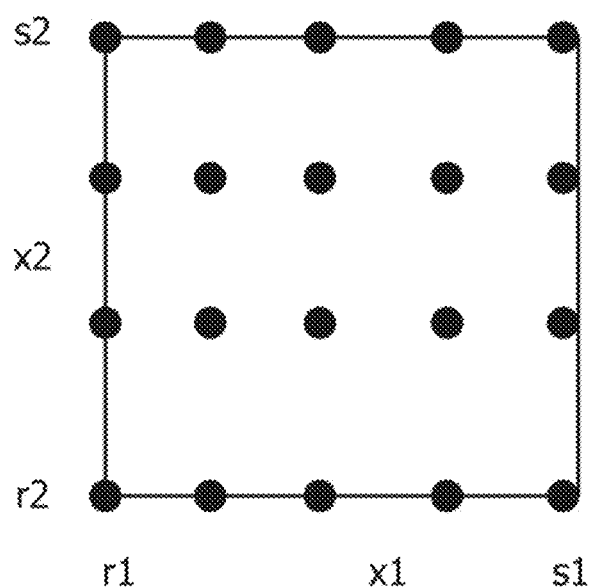
FIG. 12 is a diagram illustrating sample points.

FIG. 12 illustrates an example of the sample points p (u1, u2) in the case where m=2. This example illustrates the case where D=[r1, s1]×[r2, s2], k1=4, and k2=3. Thus, 20 sample points p (u1, u2) (u1=0 to 4, u2=0 to 3) are generated.

Even when the domain D has a shape other than that expressed by Formula (3), it is possible to generate multiple sample points in a similar manner. Use of a sufficiently large natural number as ki makes it possible to generate a large number of sample points in the domain D.

Next, the division unit 613 calculates the gradient vector df(p (u1, . . . , um)) of the regression function f(X) at each sample point p (u1, . . . , um) in accordance with the following equation (step 1102).

$$df(p(u1, \ldots, um))=(dx1(p(u1, \ldots, um)), \ldots, dxm(p(u1, \ldots, um))) \quad (5)$$

Next, the division unit 613 sets a positive threshold δ, and generates a set of sample points by using δ (step 1103). In this process, the division unit 613 compares the absolute value Abs (dxi(p (u1, . . . , um))) of each dxi(p (u1, . . . , um)) with δ and compares the absolute values Abs (dxi(p (u1, . . . , um))) with each other, thereby generating the set of sample points. Thus, the multiple sample points are classified into sets as specified below.

A(1, 1): A set of sample points where all of Abs (dx1(p (u1, . . . , um))) to Abs (dxm(p (u1, . . . , um))) are smaller than δ

A(1, 1)={p (u1, . . . , um)|Abs (dx1(p (u1, . . . , um)))<δ, . . . , Abs (dxm(p (u1, . . . , um)))<δ}

A(2, j1): A set of sample points where m−1 absolute values of Abs (dxi(p (u1, . . . , um))) are smaller than δ

A(2, j1)={p (u1, . . . , um) Abs (dxj1(p (u1, . . . , um)))<δ, . . . , Abs (dxh(p (u1, . . . , um)))]<δ(h=1, . . . , m, h≠j1)} (j1=1, . . . , m)

A(3, j1, j2): A set of sample points where m−2 absolute values of Abs (dxi(p (u1, . . . , um))) are smaller than δ

A(3, j1, j2)={p (u1, . . . , um)|Abs (dxj1(p (u1, . . . , um)))≤δ, Abs (dxj2(p (u1, . . . , um)))≥δ, Abs (dxh(p (u1, . . . , um)))<δ(h=1, . . . , m, h≠j1, j2), Abs (dxj1(p (u1, . . . , um))) Abs (dxj2(p (u1, . . . , um)))} (j1=1, . . . , m, j2=1, . . . , m, (j2≠j1))

A(4, j1, j2, j3) to A(m, j1, . . . , j(m−1)): A set of sample points where m−3 to 1 absolute values of Abs (dxi(p (u1, . . . , um))) are smaller than δ (this set is also generated in the same manner as A(3, j1, j2))

A(m+1, j1, . . . , jm): A set of sample points where all of Abs (dx1(p (u1, . . . , um))) to Abs (dxm (p (u1, . . . , um))) are equal to or larger than δ

A(m+1, j1, . . . , jm)={p (u1, . . . , um)|Abs (dxj1(p (u1, . . . , um)))≥δ, . . . , Abs (dxjm(p (u1, . . . , um)))≤δ, Abs (dxj1(p (u1, . . . , um)))≥Abs (dxj2(p (u1, . . . , um)))≥ . . . ≥Abs (dxjm(p (u1, . . . , um)))} (j1=1, . . . , m, j2=1, . . . , m, (j2≠j1), . . . , jm=1, . . . , m, (jm≠j1, . . . , j(m−1)))

A(1, 1), A(2, j1), A(3, j1, j2), A(4, j1, j2, j3) to A(m, j1, . . . , j(m−1)), and A(m+1, j1, . . . , jm) express multiple regions in the domain D.

Next, the division unit 613 generates the contribution information 623 for each region expressed by each set (step 1104). For example, the contribution information 623 includes information indicating whether or not each Abs (dxi(p (u1, . . . , um))) is equal to or larger than δ and information indicating the magnitude relation among Abs (dxi(p (u1, . . . , um))) for each region.

The information that Abs $(dxi(p(u1,\ldots,um)))$ is smaller than $\delta$ indicates that the concerned explanatory variable xi may be omitted from the regression function f(X) in the region. Therefore, the estimation unit 614 is able to remove each unnecessary explanatory variable xi based on this information in each region, and generate the regression function 624 appropriate for the region by using only the remaining explanatory variables xi.

The information indicating the magnitude relation among Abs $(dxi(p(u1,\ldots,um)))$ indicates the order of the explanatory variables xi listed in descending order of the degree of influence on the objective variable y in the region. Therefore, the estimation unit 614 is able to select N (N<m) explanatory variables xi in descending order of Abs $(dxi(p(u1,\ldots,um)))$ based on this information in each region, and generate the regression function 624 appropriate for the region by using only the selected explanatory variables xi.

Figure 13:
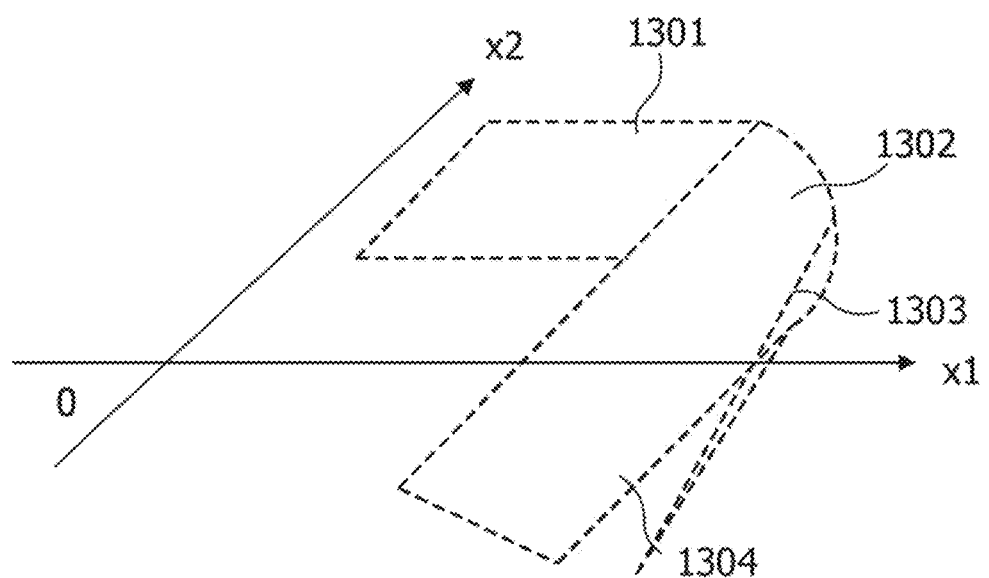
FIG. 13 is a diagram illustrating a division result.

FIG. 13 illustrates an example of a division result obtained by dividing the domain D in FIG. 9. In this example, the domain D is divided into regions 1301 to 1304. In this case, the contribution information 623 including the following information is generated.

Region 1301:
Abs $(dx1(p(u1,\ldots,um)))\geq\delta$
Abs $(dx2(p(u1,\ldots,um)))<\delta$
Region 1302:
Abs $(dx1(p(u1,\ldots,um)))\geq\delta$
Abs $(dx2(p(u1,\ldots,um)))\geq\delta$
Abs $(dx1(p(u1,\ldots,um)))\geq$Abs $(dx2(p(u1,\ldots,um)))$
Region 1303:
Abs $(dx1(p(u1,\ldots,um)))\geq\delta$
Abs $(dx2(p(u1,\ldots,um)))\geq\delta$
Abs $(dx2(p(u1,\ldots,um)))\geq$Abs $(dx1(p(u1,\ldots,um)))$
Region 1304:
Abs $(dx1(p(u1,\ldots,um)))<\delta$
Abs $(dx2(p(u1,\ldots,um)))\geq\delta$ From the above information, it is seen that x2 is omittable in the region 1301 and x1 is omittable in the region 1304. In addition, it is also seen that x1 has a greater degree of influence than x2 has in the region 1302 and x2 has a greater degree of influence than x1 has in the region 1303.

The analysis apparatus 601 in FIG. 6 generates the regression function f(X) using the observed values of the physical variables related to the motion of the moving object and calculates the gradient vector df of f(X). Thus, the analysis apparatus 601 is able to identify each explanatory variable which affects the objective variable for each region in the explanatory variable space. This makes it possible to identify the influences of physical variables on the objective variable according to the conditions of the moving object.

In order to obtain the highly accurate contribution information 623, the estimation accuracy of the regression function 622 is desirably high. As for generation of the regression function 622 using the k-nearest neighbor crossover kernel regression, there are a model with high estimation accuracy which is suitable for the k-nearest neighbor crossover kernel regression, and a model with low estimation accuracy which is not suitable for the k-nearest neighbor crossover kernel regression.

Figure 14A:
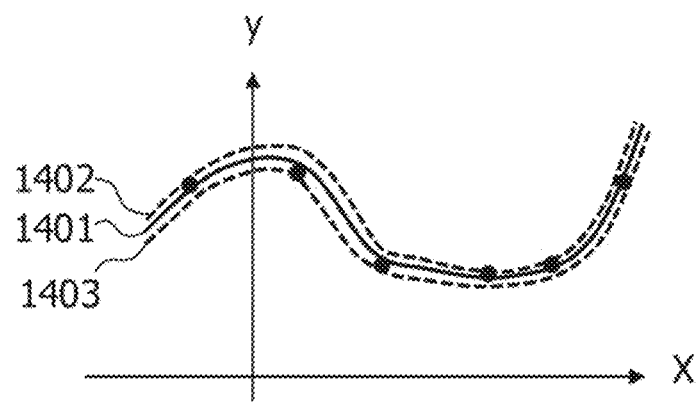
FIGS. 14A and 14B are diagrams illustrating a model with high estimation accuracy and a model with low estimation accuracy.
Figure 14B:
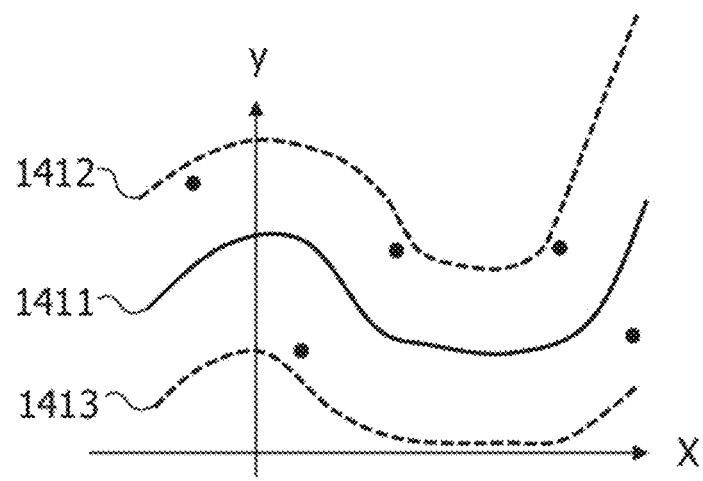

FIGS. 14A and 14B illustrate examples of a model with high estimation accuracy and a model with low estimation accuracy. The horizontal axis indicates the explanatory variable X, and the vertical axis indicates the objective variable y.

FIG. 14A illustrates the example of the model with high estimation accuracy. Each point indicates an observed value of (X, y). This model represents a model describing the motion of a moving object such as an EV, and does not largely change the observed value of y with a slight change of the observed value of X.

A curve 1401 indicates the regression function f(X) generated by the k-nearest neighbor crossover kernel regression from the observed values of (X, y), and the gap between broken lines 1402 and 1403 indicates the range of variability (variance value) of the observed values of y with respect to the regression function f(X). This model has a narrow range of variability of the observed values.

FIG. 14B illustrates an example of a model with low estimation accuracy. Each point indicates an observed value of (X, y). This model represents a model in which the value of the objective variable y is determined by a probability, for example, like a stock price, a position estimation by Brownian motion, or the like, and largely changes the observed value of y even with a slight change of the observed value of X.

A curve 1411 indicates the regression function f(X) generated by the k-nearest neighbor crossover kernel regression from the observed values of (X, y), and the gap between broken lines 1412 and 1413 indicates the range of variability of the observed values of y with respect to the regression function f(X). This model has a wide range of variability of the observed values.

Figure 15A:
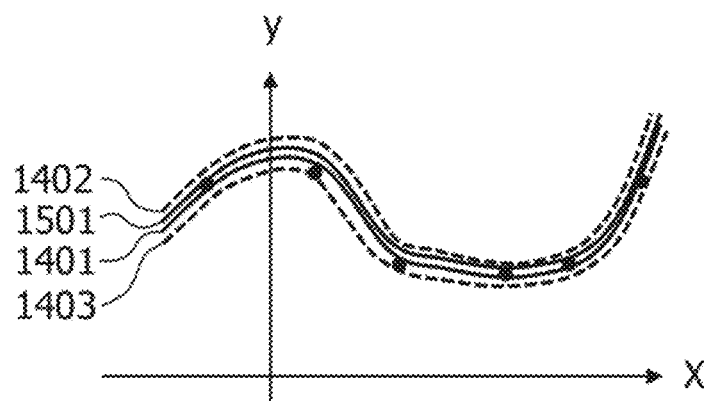
FIGS. 15A and 15B are diagrams each illustrating plural regression functions.
Figure 15B:
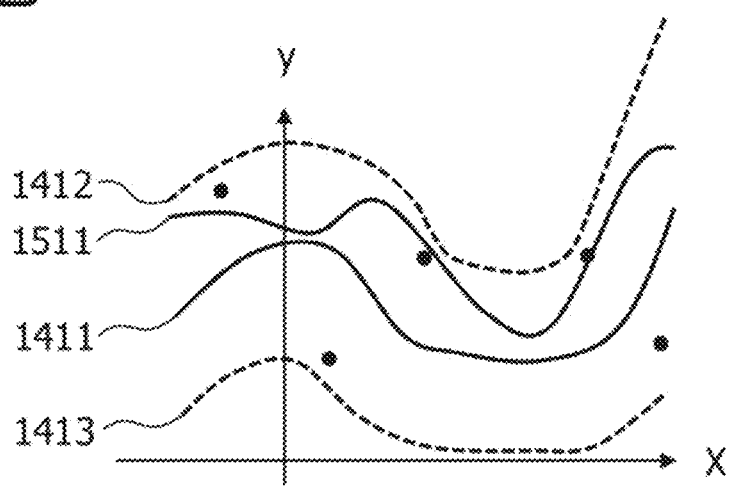

FIGS. 15A and 15B each illustrate an example of plural regression functions in the model illustrated in FIG. 14A or 14B. FIG. 15A illustrates the example of the plural regression functions in the model in FIG. 14A. A curve 1501 indicates a regression function g(X) generated from other observed values of (X, y) by the k-nearest neighbor crossover kernel regression.

Since this model has a narrow range of variability of the observed values with respect to f(X) and g(X), g(X) is approximated to f(X) and the gradient vector dg of g(X) is also approximated to the gradient vector df of f(X). Therefore, the division result of the region division based on dg is also approximated to the division result of the region division based on df. As a result, the variation between the division results due to the difference between the regression functions is small. When the variation between the division results is small, the accuracy of the contribution information 623 is high, which makes it possible to select appropriate explanatory variables xi.

FIG. 15B illustrates the example of the plural regression functions in the model in FIG. 14B. A curve 1511 indicates a regression function g(X) generated from other observed values of (X, y) by the k-nearest neighbor crossover kernel regression.

This model has a wide range of variability of the observed values with respect to f(X) and g(X), which results in g(X)≠f(X) and dg—df. Therefore, the division result of the region division based on dg is also significantly different from the division result of the region division based on df. As a result, the variation between the division results due to the difference between the regression functions is large. When the variation between the division results is large, the accuracy of the contribution information 623 is low, which makes it difficult to select appropriate explanatory variables xi.

Figure 16:
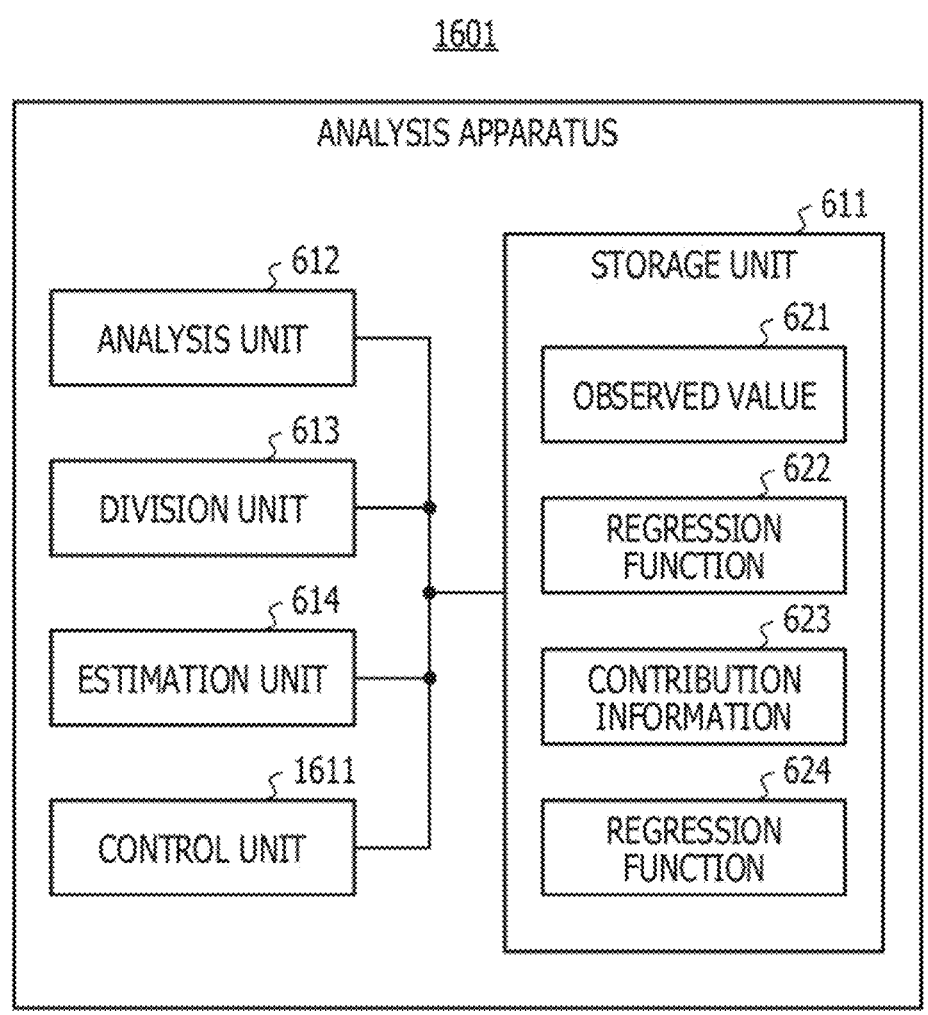
FIG. 16 is a functional configuration diagram illustrating a second specific example of the analysis apparatus.

FIG. 16 illustrates a second specific example of the analysis apparatus 401 in FIG. 4. An analysis apparatus 1601 illustrated in FIG. 16 has a configuration in which the output unit 615 in the analysis apparatus 601 in FIG. 6 is replaced with a control unit 1611. For example, the analysis apparatus 1601 may be an information processing apparatus mounted on an EV or the like.

The control unit 1611 determines a target value for each explanatory variable such that a desired estimated value will be obtained, based on the estimated value generated by the estimation unit 614 using the regression function 624. Then, the control unit 1611 outputs a control signal to bring the physical element represented by the explanatory variable close to the target value, thereby controlling the motion of the moving object.

Here, assume, for example, the case where the moving object is an EV, the objective variable is the SOC, and the physical element to be controlled is the speed of the EV. In this case, the control unit 1611 determines a target value of the speed at which a desired SOC will be obtained. Then, the control unit 1611 outputs a control signal to bring the speed close to the target value, thereby controlling the motion of the EV.

The configurations of the analysis apparatus 401 in FIG. 4, the analysis apparatus 601 in FIG. 6, and the analysis apparatus 1601 in FIG. 16 are merely examples, and some of the constituent elements thereof may be omitted or modified depending on usage or conditions of the analysis apparatuses. For example, the estimation unit 614 may be omitted in the analysis apparatus 601 in FIG. 6, when the processing of generating the regression function 624 is performed by an external apparatus. In this case, the output unit 615 may output the contribution information 623 instead of the estimated value.

The flowcharts in FIGS. 5 and 11 are merely examples, and part of the processing may be omitted or modified depending on the configuration or conditions of the analysis apparatus. For example, in the division processing in FIG. 11, the division unit 613 may generate a set of sample points by using a result obtained by differentiating the regression function f(X) two or more times instead of using the gradient vectors df of the regression function f(X).

The explanatory variable spaces illustrated in FIGS. 1 to 3 are merely examples, and the explanatory variable space varies depending on a moving object to be analyzed and physical elements. The regression function f(X) and the gradient vectors df illustrated in FIGS. 7 to 10B are only examples, and the regression function f(X) and the gradient vectors df vary depending on a moving object to be analyzed and physical elements. The sample points illustrated in FIG. 12 are only an example, and the sample points vary depending on the domain of the regression function f(X). The division result illustrated in FIG. 13 is only an example, and the division result varies depending on the regression function f(X).

The models illustrated in FIGS. 14A to 15B are only examples, and the model for use in the analysis varies depending on the usage or conditions of the analysis apparatus.

The calculation equations in Formulas (1) to (5) are merely examples, and other calculation equations may be used depending on the configuration or conditions of the analysis apparatus.

Figure 17:
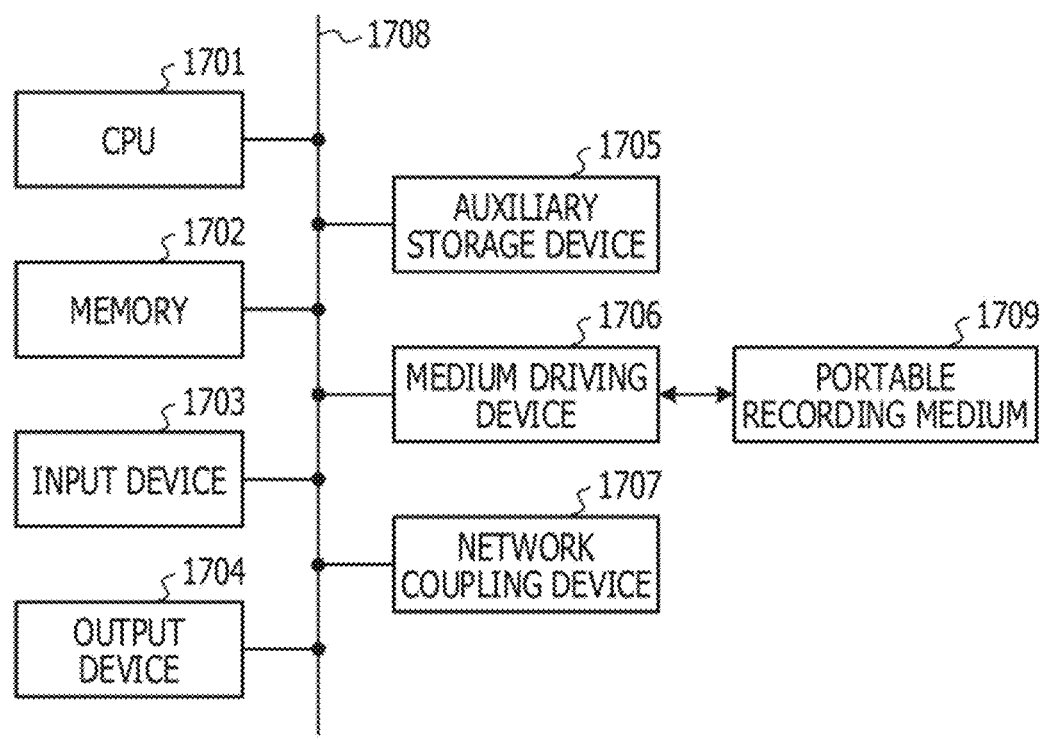
FIG. 17 is a configuration diagram of an information processing apparatus.

FIG. 17 illustrates a configuration example of an information processing apparatus (computer) used as the analysis apparatus 401 in FIG. 4, the analysis apparatus 601 in FIG. 6, or the analysis apparatus 1601 in FIG. 16. The information processing apparatus in FIG. 17 includes a central processing unit (CPU) 1701, a memory 1702, an input device 1703, an output device 1704, an auxiliary storage device 1705, a medium driving device 1706, and a network coupling device 1707. These constituent elements are coupled to each other via a bus 1708.

The memory 1702 is, for example, a semiconductor memory such as a read-only memory (ROM), a random-access memory (RAM), and a flash memory, and stores programs and data used for processing. The memory 1702 may be used as the storage unit 411 in FIG. 4, the storage unit 611 in FIG. 6, or the storage unit 611 in FIG. 16.

The CPU 1701 (processor) operates as the analysis unit 412 and the division unit 413 in FIG. 4 by executing a program using the memory 1702, for example. The CPU 1701 also operates as the analysis unit 612, the division unit 613, and the estimation unit 614 in FIGS. 6 and 16 by executing a program using the memory 1702. The CPU 1701 also operates as the control unit 1611 in FIG. 16 by executing a program using the memory 1702.

The input device 1703 is, for example, a keyboard, a pointing device, or the like and is used for input of instructions or information from an operator or a user. The output device 1704 is, for example, a display device, a printer, a speaker, or the like, and is used for output of inquiries or instructions to the operator or the user and output of a processing result. The processing result may be the contribution information 623, or the estimated value generated by the estimation unit 614. The output device 1704 may be used as the output unit 615 in FIG. 6.

The auxiliary storage device 1705 is, for example, a magnetic disk drive, an optical disk drive, a magneto-optical disk drive, a tape drive, or the like. The auxiliary storage device 1705 may be a hard disk drive or a flash memory. The information processing apparatus stores the programs and data in the auxiliary storage device 1705 and may use the programs and data by loading them into the memory 1702. The auxiliary storage device 1705 may be used as the storage unit 411 in FIG. 4, the storage unit 611 in FIG. 6, or the storage unit 611 in FIG. 16.

The medium driving device 1706 drives a portable recording medium 1709 and accesses data recorded therein. The portable recording medium 1709 is a memory device, a flexible disk, an optical disk, a magneto-optical disk, or the like. The portable recording medium 1709 may be a compact disc read-only memory (CD-ROM), a digital versatile disc (DVD), a Universal Serial Bus (USB) memory, or the like. The operator or the user may store the programs and data in the portable recording medium 1709, and use the programs and data by loading them into the memory 1702.

A computer-readable recording medium in which the programs and data to be used for the processing are stored as described above is a physical (non-transitory) recording medium like the memory 1702, the auxiliary storage device 1705, or the portable recording medium 1709.

The network coupling device 1707 is a communication interface circuit that is coupled to a communication network such as a local area network (LAN) or a wide area network (WAN) and performs data conversion required for communication. The information processing apparatus may receive programs and data from external devices via the network coupling device 1707 and use the programs and data by loading them into the memory 1702. The network coupling device 1707 may be used as the output unit 615 in FIG. 6.

Note that the information processing apparatus does not have to include all the constituent elements in FIG. 17, and some of the constituent elements may be omitted depending on its usage or conditions. For example, if an interface with the user or the operator is not used, the input device 1703 and the output device 1704 may be omitted. In the case where the portable recording medium 1709 or the communication network is not used, the medium driving device 1706 or the network coupling device 1707 may be omitted.

Although the disclosed embodiments and their advantages have been described in detail, those skilled in the art may make various modifications, additions, and omissions without departing from the scope of the present disclosure which is clearly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an analysis program causing a computer to execute processing comprising:
   generating a regression function including a plurality of explanatory variables and an objective variable based on regression analysis;
   accessing observed values of a plurality of physical variables each related to motion of a moving object;
   specifying a domain in an explanatory variable space containing the plurality of explanatory variables and including the observed values of the physical variables:
   generating a plurality of points in the domain:
   calculating gradients of the regression function at the plurality of points:
   comparing each component of each calculated gradient corresponding to each explanatory variable with a threshold;
   dividing the domain of the explanatory variable space into a plurality of regions based on results of the comparisons; and
   generating contribution information on a contribution of each explanatory variable to the objective variable for each of the plurality of regions,
   wherein the contribution information indicates whether or not each component of each calculated gradient corresponding to each explanatory variable is larger than the threshold for each of the plurality of regions.

2. The non-transitory computer-readable recording medium according to claim 1, wherein
   the moving object is an electric vehicle, and
   each of the plurality of explanatory variables and the objective variable represents any one of physical variables including a speed of the electric vehicle, a travel distance of the electric vehicle, a voltage of a battery, an output current of the battery, a state of charge of the battery, a wind speed, a wind direction, and a gradient of a road surface.

3. The non-transitory computer-readable recording medium according to claim 1, wherein
   the regression function is once differentiable, and
   a derivative of the regression function after differentiation is continuous.

4. An information processing apparatus comprising:
   a memory; and
   a computer coupled to the memory and configured to:
   generate a regression function including a plurality of explanatory variables and an objective variable based on regression analysis;
   access observed values of a plurality of physical variables each related to motion of a moving object;
   specify a domain in an explanatory variable space containing the plurality of explanatory variables and including the observed values of the physical variables:
   generate a plurality of points in the domain:
   calculate gradients of the regression function at the plurality of points:
   compare each component of each calculated gradient corresponding to each explanatory variable with a threshold;
   divide the domain of the explanatory variable space into a plurality of regions based on results of the comparisons; and
   generating contribution information on a contribution of each explanatory variable to the objective variable for each of the plurality of regions,
   wherein the contribution information indicates whether or not each component of each calculated gradient corresponding to each explanatory variable is larger than the threshold for each of the plurality of regions.

5. An analysis method comprising:
   generating, by a computer, a regression function including a plurality of explanatory variables and an objective variable based on regression analysis;
   accessing observed values of a plurality of physical variables each related to motion of a moving object;
   specifying a domain in an explanatory variable space containing the plurality of explanatory variables and including the observed values of the physical variables:
   generating a plurality of points in the domain:
   calculating gradients of the regression function at the plurality of points:
   comparing each component of each calculated gradient corresponding to each explanatory variable with a threshold;
   dividing the domain of the explanatory variable space into a plurality of regions based on results of the comparisons; and
   generating contribution information on a contribution of each explanatory variable to the objective variable for each of the plurality of regions,
   wherein the contribution information indicates whether or not each component of each calculated gradient corresponding to each explanatory variable is larger than the threshold for each of the plurality of regions.

* * * * *